United States Patent [19]
Bober

[11] 3,944,446
[45] Mar. 16, 1976

[54] METHOD OF INDUCTIVELY HEATING AND QUENCH HARDENING CAMSHAFTS

[75] Inventor: Lee M. Bober, Newburgh Heights, Ohio

[73] Assignee: Park-Ohio Industries, Inc., Cleveland, Ohio

[22] Filed: May 22, 1975

[21] Appl. No.: 580,064

[52] U.S. Cl. ............... 148/131; 148/146; 148/150; 148/153
[51] Int. Cl.² .......................................... C21D 9/30
[58] Field of Search ........... 148/131, 146, 150, 152, 148/153

[56] References Cited
UNITED STATES PATENTS
3,662,995  5/1972  Armstrong ......................... 148/131

*Primary Examiner*—R. Dean
*Attorney, Agent, or Firm*—Meyer, Tilberry & Body

[57] ABSTRACT

A method of inductively heating and quench hardening an elongated camshaft having a central axis, an elongated body portion, at least three axially spaced bearing surfaces on the body portion, and axially spaced cam surfaces on the body portion and encircling the axis, this method comprises: providing a generally cylindrical multi-turn inductor having an elongated workpiece receiving opening extending in a given direction, rotatably mounting the camshaft in the workpiece receiving passage, rotating the workpiece about its given axis, energizing the inductor with a high frequency alternating current, continuing the energizing and rotating step until the surfaces are inductively heated to a quench hardening temperature, removing the workpiece from the workpiece receiving opening, clamping the workpiece on at least three of the bearing surfaces for rotation about a quench axis corresponding to the camshaft central axis, restraining at least three clamped bearing surfaces from transverse movement, and then quenching the clamped and restrained camshaft with a quenching liquid while the camshaft is being rotated to prevent undue distortion and cracking of the camshaft.

4 Claims, 8 Drawing Figures

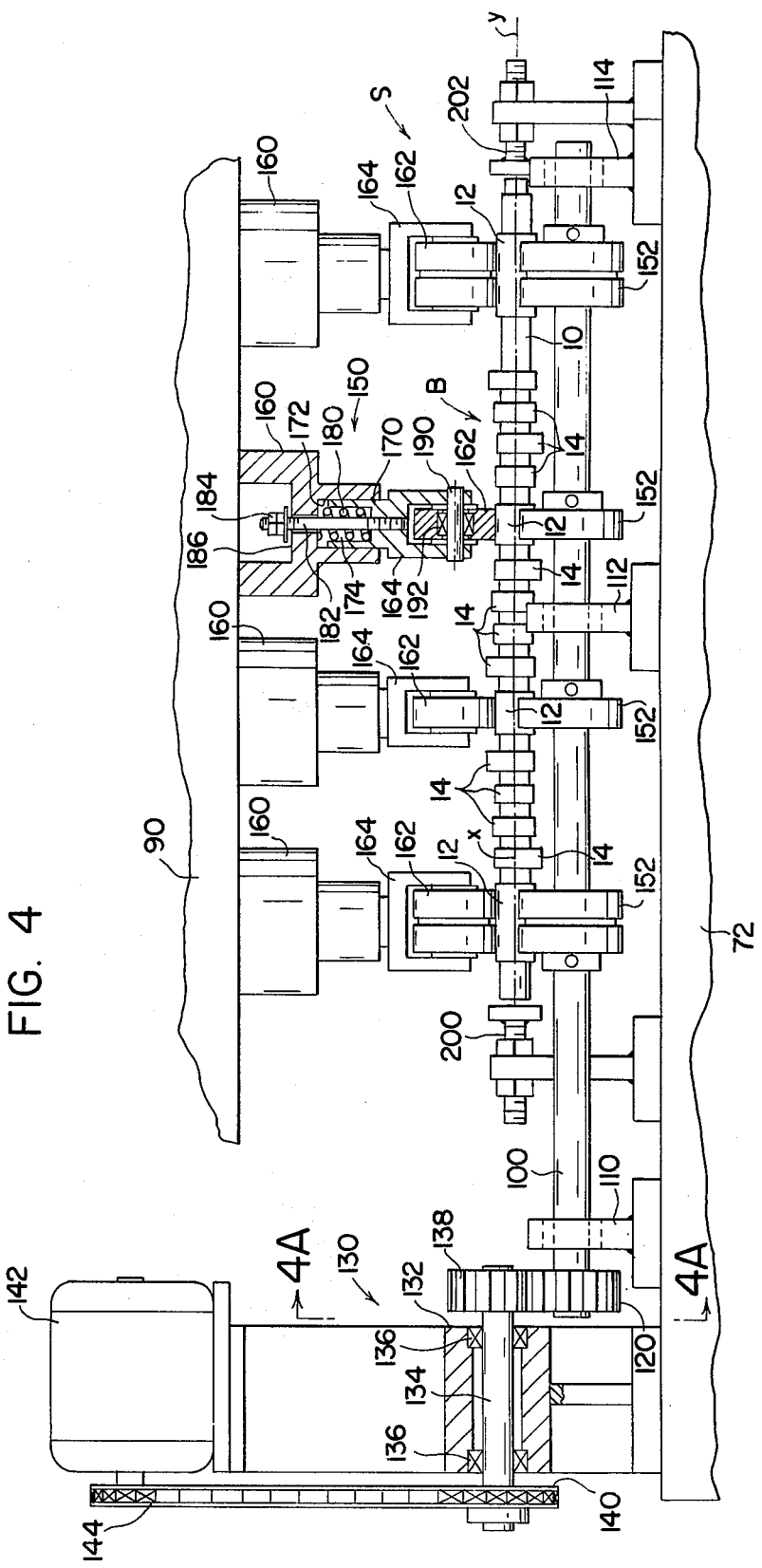

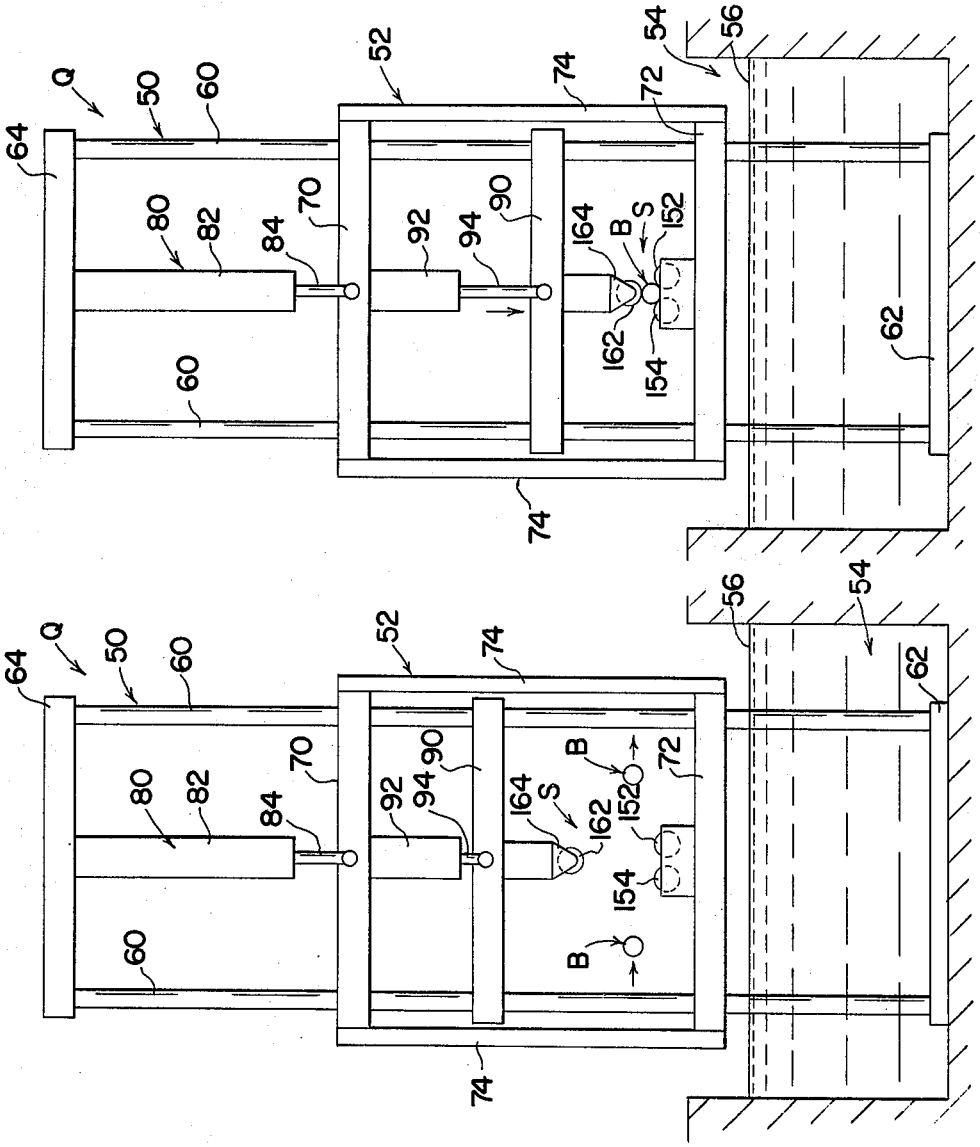

METHOD OF INDUCTIVELY HEATING AND QUENCH HARDENING CAMSHAFTS

The present invention relates to the art of induction heating and, more particularly, to the art of induction heating and then quench hardening camshafts.

The invention is particularly applicable for the induction heating and quench hardening of camshafts used in internal combustion engines, and it will be described with particular reference thereto; however, it is appreciated that the invention has much broader applications and may be used for inductively heating other shafts.

The camshaft for an internal combustion engine includes an elongated body portion rotatable about a given axis and having spaced cam surfaces and bearing surfaces. To prevent rapid wear, these surfaces are hardened. At one time, the camshaft was carburized and heated in a furnace to a desired hardening temperature throughout. Thereafter, the heated camshaft was quench hardened to provide hardened surfaces. This procedure resulted in substantial distortion and often required the additional step of straightening. Subsequent straightening of the camshaft required additional handling and processing. To overcome some of these disadvantages and to employ the advantages of induction heating, several arrangements have been provided for inductively heating the camshafts prior to quench hardening. To prevent undue distortion, each of the separate bearing surfaces and cam surfaces were individually inductively heated to a limited depth by an encircling inductor and then quench hardened. In this manner, the internal portion of the camshaft was not heated to a hardening temperature. This surface heating reduced the total energy required for heating the surfaces prior to quench hardening. This is a substantial cost savings over prior processes requiring heating of the total camshaft. When high frequency, such as 3–10 kc, was used in an induction heating process, only the metal in a small layer adjacent the surfaces was inductively heated to a quench hardening temperature. During quenching, a case hardened surface was created on the bearing and cam surfaces in accordance with standard induction heating techniques. Although this induction heating process did substantially reduce the energy required for selectively hardening the various surfaces on the camshafts, individual heating of the surfaces required a substantial amount of time and complicated indexing and handling mechanisms. To overcome these difficulties, inductors were developed which would inductively heat a group of surfaces prior to quench hardening of that particular group of surfaces. This reduced the processing time and thus increased the productivity of the induction heating process. However, successive heating of various groups of surfaces was required and the camshaft or inductors were indexed. To overcome the requirement of indexing, it was suggested that an elongated induction heating coil having a length substantially matching the length of the camshaft could be placed around the camshaft to heat inductively all bearing and cam surfaces at one time. This type of process, where all surfaces are simultaneously heated by high frequency, such as 3–10 kc, was adpoted to reduce the overall processing time. However, by inductively heating the outer exposed surfaces of the camshaft in a single induction heating operation, distortion was again experienced and straightening was often required. This straightening could result in cracks and other defects which required scrapping of the inductively heated and quench hardened camshaft.

The present invention relates to an improvement in a method of inductively heating and quench hardening the bearing surfaces and cam surfaces on a camshaft, which method overcomes the disadvantages experienced in prior attempts to inductively heat these surfaces and then quench harden them for subsequent wear resistance.

The primary object of the present invention is the provision of a method of inductively heating and quench hardening bearing and cam surfaces of a camshaft, which method involves inductively heating several, if not all, cam and bearing surfaces of the camshaft simultaneously.

Yet another object of the present invention is the provision of a method and apparatus for inductively heating and quench hardening bearing and cam surfaces of a camshaft, which method involves inductively heating several, if not all, cam and bearing surfaces simultaneously with high frequency in the general range of 3–10 kc.

Another object of the present invention is the provision of a method as defined above, which method results in a camshaft that does not require subsequent straightening.

Still a further object of the present invention is the provision of a method as defined above, which method results in a camshaft that requires a minimum of further processing.

Still a further object of the present invention is the provision of a method as defined above, which method results in a minimum of rejected camshafts.

These and other objects and advantages will become apparent from the following description taken together with the accompanying drawings in which:

FIG. 4 is a side elevational view, somewhat cross-sectioned, illustrating the clamping and restraining mechanism, together with the rotating mechanism, utilized in performing the preferred embodiment of the present invention;

Figure 1:
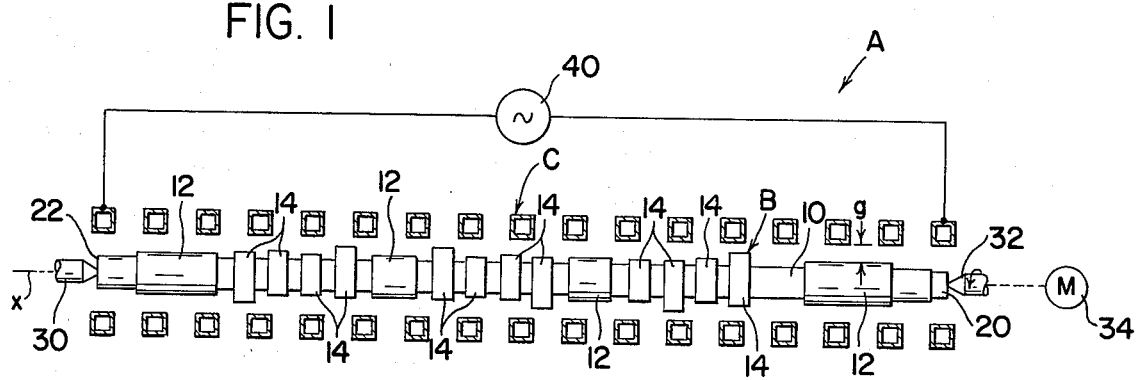
FIG. 1 is a schematic diagram of the induction heating station used in the preferred embodiment of the present invention.

Referring now to the drawings wherein the showings are for the purpose of illustrating the preferred embodiment of the invention only and not for the purpose of limiting same, FIG. 1 shows an induction heating station A for inductively heating the cam and bearing surfaces of a camshaft B having a central rotational axis $x$. The camshaft is formed of iron or steel and includes a body portion 10, axially spaced bearing surfaces 12 and axially spaced cam surfaces 14, in accordance with camshaft design. In induction heating station A, an elongated multi-turn indicator C encircles the camshaft and is provided with appropriate spacing $g$ which is an air gap selected for the desired induction heating. This gap changes in the area of the cams 14 since they are not concentric with axis $x$. The air gap $g$ is selected to provide optimum induction heating of camshaft B in the heating station A. As can be seen, in the preferred embodiment of the invention, inductor C extends over the total length of camshaft B and simultaneously inductively heats all bearing surfaces 12 and cam surfaces 14. As is well known, induction heating, especially with high frequency in the range of 3–10 kc, will inductively heat only the outer surfaces of camshaft B. The body portion adjacent the center of the camshaft is not inductively heated to a quench hardening temperature, while the outer surfaces are inductively heated to a temperature above the quench hardening temperature for the particular metal forming camshaft B. This is all in accordance with known induction heating technology. Uniform heating of camshaft B is facilitated by rotating the camshaft during the heating operation. This can be accomplished by various mechanisms, schematically illustrated in FIG. 1 as a device engaging the opposite ends 20, 22 of camshaft B by centers 30, 32, respectively. Center 30 is driven by a schematically represented motor 34 during the heating operation to rotate the camshaft around its central axis $x$. A high frequency alternating current is applied through inductor C by an appropriate device such as generator 40 which provides a high frequency alternating current in the general range of 3–10 kc. In practice a transformer is used between generator 40 and inductor C. At this high frequency, only the outermost portions of the camshaft are inductively heated during the heating cycle to a temperature sufficient for subsequent quench hardening so that the resulting camshaft will have hardened outer surfaces, especially at the bearing surfaces 12 and cam surfaces 14.

Figure 2:
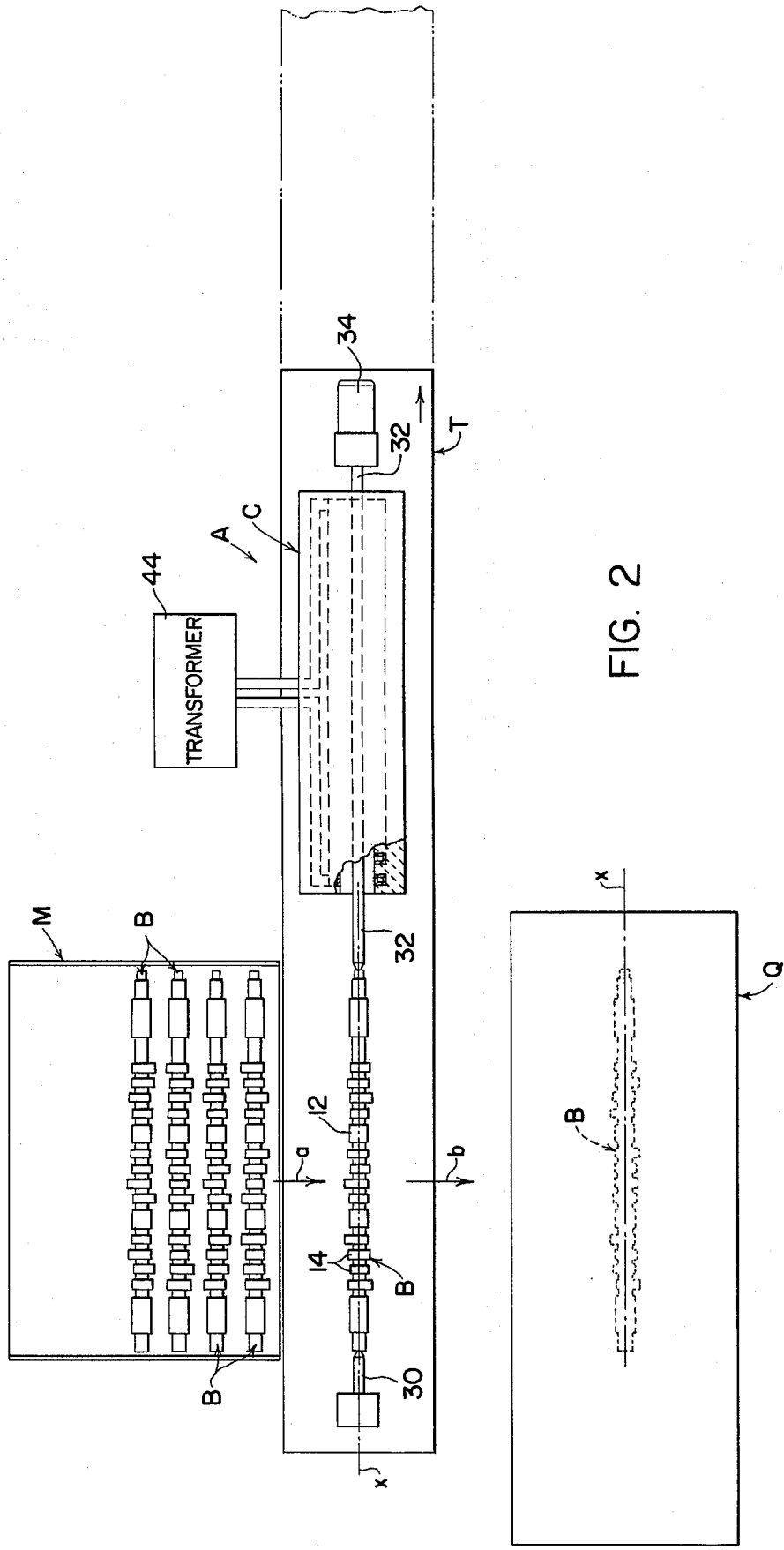
FIG. 2 is a schematic diagram illustrating the general apparatus layout for performing the preferred embodiment of the present invention.

Referring now to FIG. 2, the camshafts, in the preferred embodiment, are supplied to induction heating station A by an appropriate feeding device, schematically illustrated as a magazine M. By an appropriate escapement or other feeding device, a camshaft B is directed along arrow $a$ to a position between centers 30, 32. The centers are mounted on appropriate transfer device T for reciprocation with respect to coil C, which is connected to a transformer 44 in FIG. 2. The transformer is part of the power supply shown as a generator 40 in FIG. 1. After the heating operation, and before the heated camshaft surfaces cool below a quench hardening temperature, the camshaft is transferred, by an appropriate mechanism along the path indicated by arrow $b$, to a quench fixture Q, which will be explained later. The transfer mechanism between centers 30, 32 and quench fixture Q may be any appropriate device which positively removes the camshaft and locates it within quench fixture Q. One such mechanism includes pivoting transfer fingers. In operation, an appropriate escapement allows a camshaft to be located between centers 30, 32. Thereafter, the centers are brought together to grasp the ends 20, 22 of the camshaft. Transfer device T then shifts to the right as shown in FIG. 2 until the centered camshaft is within coil C, as shown in FIG. 1. Thereafter, motor 34 rotates the camshaft while transformer 44 applies a high frequency alternating current to elongated, multi-turn inductor C. After the appropriate heating cycle, transfer device T is shifted to the position shown in FIG. 2 and an appropriate transfer arrangement shifts the heated camshaft from centers 30, 32 to the quench fixture Q for further processing. The camshaft transfer takes place before surfaces 12, 14 are cooled below the quench hardened temperature so that subsequent quench hardening will provide these surfaces with a hardened finish.

Figure 4A:
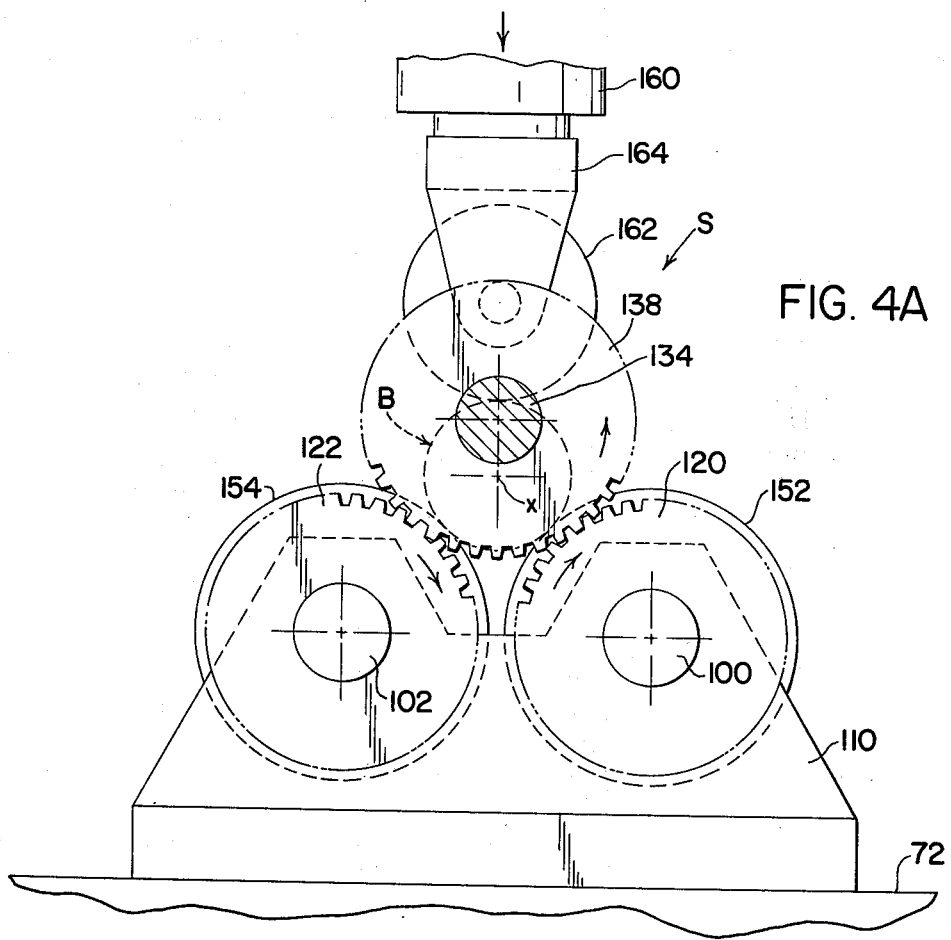
FIG. 4A is an enlarged cross-sectional view taken generally along line 4A—4A of FIG. 4; and, FIGS. 5, 5A and 5B are schematic operating diagrams illustrating the previously shown mechanisms in various operating positions used in performing the preferred embodiment of the present invention.
Figure 3:
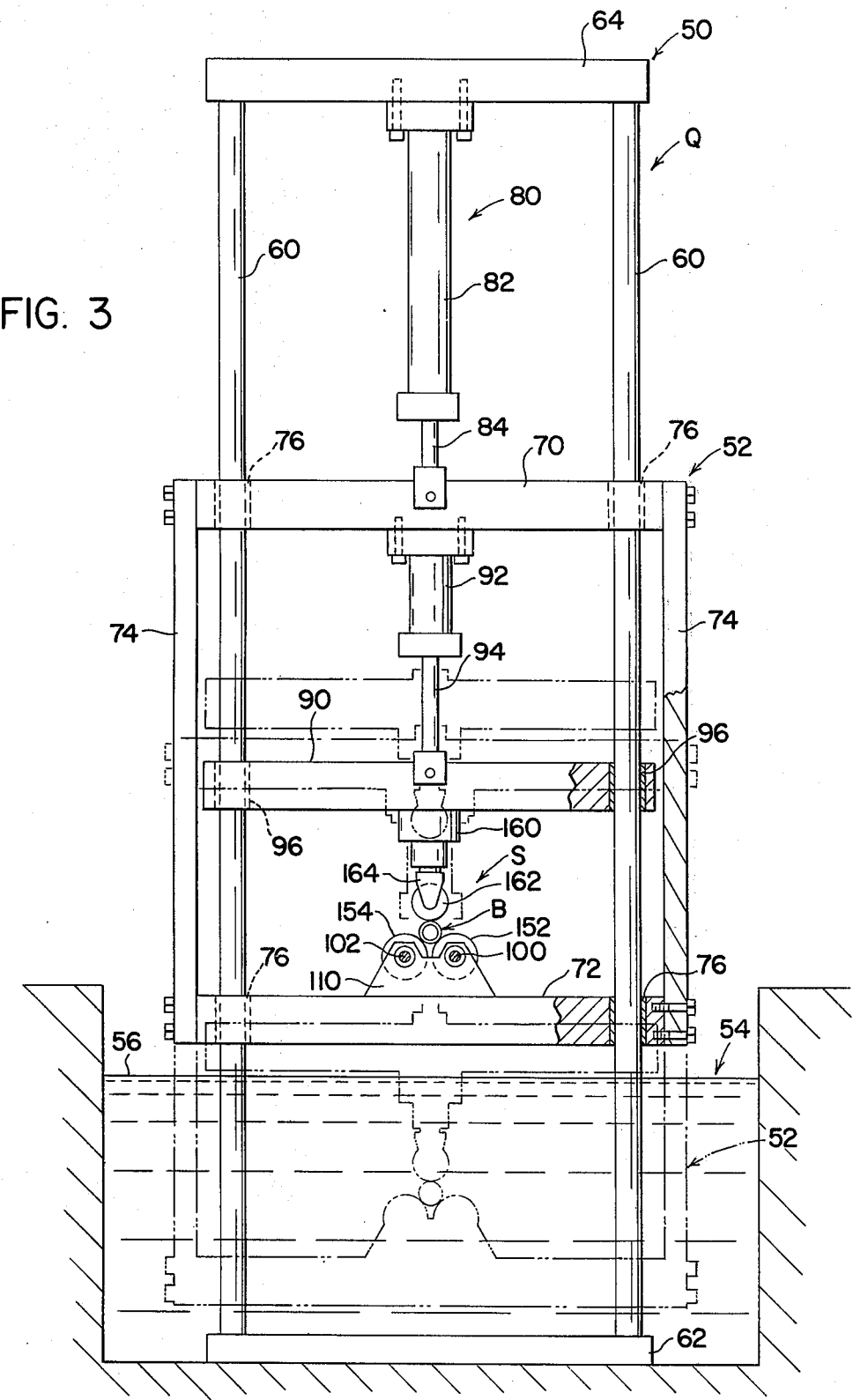
FIG. 3 is a plan view showing somewhat schematically an apparatus for performing a certain aspect of the preferred embodiment of the present invention.

Referring now to the quench fixture Q, as shown in FIG. 3, this fixture includes a support frame 50, a movable clamping frame 52 and a camshaft support mechanism S, best shown in FIGS. 4 and 4A, and supported on the clamping frame. Support frame 50 is located within a quench tank 54 having an appropriate design and having a quenching liquid to a level 56. Support frame 50 is generally stationary and includes at least four corner pillars 60, only two of which are shown in FIG. 3. Plates 62, 64 are supported between pillars 60 to provide a unified support structure onto which clamping frame 52 reciprocates in the direction of the arrows shown in FIG. 3. Clamping frame 52 includes an upper plate 70 and a lower plate 72. These plates are held together by appropriate corner support bars 74, four of which are used even though only two are shown. Plates 70, 72 are also journalled for reciprocation on pillars 60 by bushings 76. A means 80 is provided for moving clamping frame 52 with respect to frame 50. Moving means 80 could include a variety of structures. In accordance with the illustrated embodiment, a cylinder 82 is secured onto plate 64 and a rod 84 is secured onto plate 70. Although only one cylinder and rod assembly is illustrated, two or more similar assemblies may be provided for moving frame 52 with respect to support frame 50. Between movable plates 70, 72 of clamping frame 52 is a further movable plate 90 which is vertically movable by an appropriate arrangement, such as a cylinder 92 having a rod 94. This cylinder is secured onto plate 70 and the rod is secured onto the upper portion of movable plate 90. Reciprocal movement of plate 90 is guided by pillars 60 by bushings 96. Support mechanism S, best shown in FIGS. 4 and 4A and schematically shown in FIGS. 5, 5A and 5B, is located between plates 90 and 72. Mechanism S clamps the camshaft and allows rotation thereof during the quenching operation in tank 54 without transverse movement or distortion. A variety of structures could be used for this purpose; however, in the illustrated embodiment two elongated, generally parallel shafts 100, 102 are journalled in axially spaced stands 110, 112 and 114. These shafts are provided with pinion gears 120, 122, respectively, so that they are rotated in unison along axes parallel to axis $x$ of camshaft B. To rotate these two generally parallel shafts, there is provided an appropriate mechanism, such as a block 132 for supporting a drive shaft 134 secured onto the block by bearings 136. A drive gear 138 is secured onto one end of shaft 134 and meshes with both pinion gears 120, 122 as shown in FIG. 4A. To drive gear 138, there is provided a sprocket 140 rotated by a spaced motor 142 through a chain 144. Thus, selective operation of motor 142 drives spaced, parallel shafts 100, 102 which extend along and generally below camshaft B.

A clamping and transverse restraining means 150 is provided at each bearing surface 12, as best shown in FIG. 4. Of course, in some instances it may not be necessary to employ a clamping and restraining means 150 at each of the bearing surfaces. At least, such a device should be provided at the opposite ends and generally at the center of the camshaft during the quenching operation in fixture Q. Shafts 100, 102 include transversely spaced rollers 152, 154 at each bearing surface. These rollers form a pair and provide a nest for a bearing surface 12 on camshaft B. In some instances, the rollers may have a greater axial length to accommodate larger bearing surfaces 12, as is shown in FIG. 4. The pairs of rollers provide a nest for camshaft B so that it can rotate about its central axis $x$ when shafts 100, 102 are rotated by motor 142. Above each pair of rollers 152, 154, clamping and restraining means 150 includes a housing 160 secured upon movable plate 90 of clamping frame 52. An upper supporting roller 162 is journalled by a trunnion 164 mounted on housing 160. This upper roller is biased against bearing surface 12 when a camshaft is clamped within support mechanism S. Such biasing can be accomplished in several ways; however, in the illustrated embodiment, roller 162 is spring biased toward rollers 152, 154. Each upper roller 162 is separately biased by an appropriate mechanism including a sliding connection formed from a stem 170 secured onto trunnion 164 and a bore 172 in housing 160. A spring recess 174 in trunnion 164 adjacent stem 170 houses a compression spring 180. An appropriate arrangement to provide a stop for outward movement of trunnion 164 is also provided. In the illustrated embodiment, this mechanism is a bolt 182 having an upper nut 184 which is adjusted to engage a shoulder 186 of housing 160. A shaft 190 carries bearing 191 for rotatably mounting roller 162 about an axis generally parallel to the axes of rotatable shafts 100, 102. The other clamping and restraining means have a like structure and for simplicity are not described.

In operation, as plate 90 is forced downward toward plate 72, rollers 162 engage bearing surfaces 12 and force the bearing surfaces into a clamped position with respect to lower rollers 152, 154. Thereafter, motor 142 rotates rollers 152, 154 to rotate camshaft B while it is restrained from transverse distortion by rollers 162. Springs 180 provide a balancing for slight tolerance differences between the different bearing surfaces 12 and have a spring constant sufficient to restrain camshaft B from transverse movement during a subsequent quenching operation. Location of camshaft B in quench fixture Q is provided by axially spaced adjustable locators 200, 202.

In operation, the clamping frame 52 is first positioned as shown in FIG. 5. After a camshaft has been inductively heated so that the bearing surfaces and cam surfaces are above a quench hardening temperature, such as approximately 1400°–1800°F in normal situations, the heated camshaft is shifted between locators 200, 202 and above the various pairs of rollers 152, 154. Before this takes place, a previously quenched workpiece is shifted from quench fixture Q, as shown by the right hand arrow in FIG. 5. After a camshaft is properly located in mechanism S, cylinder 92 is filled with a liquid. This extends rod 94 driving plate 90 along pillars 60 into the position shown in FIG. 5A. Thereafter, the heated camshaft is rotated by motor 142 along an axis generally corresponding to the central axis $x$ of the camshaft. This rotating axis is labeled $y$ in FIG. 4. While rotating, cylinder 80 is filled with a liquid to drive frame 52 into the position shown in FIG. 5B. This allows rotation of camshaft B as it is forced into the quenching liquid of tank 54, which liquid may be water or another quenching liquid. The quenching operation is started before the metal adjacent surfaces 12, 14 cools below the quench hardening temperature for such metal; therefore, during quenching and rotation, the bearing and cam surfaces are quench hardened for subsequent wear resistance. By providing the lateral restraints and rotation, distortion during the quenching operation is minimized to a level which does not require subsequent straightening of the camshaft. After the quenching operation has been completed, rods 84, 94 are retracted as shown in FIG. 5 and the quench hardened camshaft is removed from quench fixture Q and replaced by a heated camshaft.

Having thus defined my invention, I claim:

1. A method of inductively heating and quench hardening an elongated camshaft having a central axis, an elongated body portion, at least three axially spaced bearings on said body portion and having bearing surfaces generally concentric with said axis and axially spaced cams on said body portion and having cam surfaces encircling said axis, said method comprising the steps of:
    a. providing a generally cylindrical multi-turn inductor having an elongated workpiece receiving opening extending in a given direction;
    b. rotatably mounting said camshaft in said workpiece receiving passage with said central axis extending in said given direction;
    c. rotating said workpiece about said given axis;
    d. energizing said inductor with a high frequency alternating current while said workpiece is rotating;
    e. continuing said energizing and rotating steps until said surfaces are inductively heated to a temperature above a quench hardening temperature and a part of said body portion is below a quench hardening temperature;
    f. then removing said workpiece from said workpiece receiving opening;
    g. before said surfaces cool below the quench hardening temperature, clamping said workpiece on at least three of said bearing surfaces for rotation about a quench axis corresponding to said workpiece central axis;
    h. restraining said at least three clamped bearing surfaces from transverse movement;
    i. before said surfaces cool below the quench hardening temperature, quenching said clamped and restrained workpiece with a quenching liquid until said surfaces are quenched to a temperature before the hardening temperature; and,
    j. rotating said clamped and restrained workpiece about said quench axis during said quenching step.

2. A method as defined in claim 1 wherein said alternating current has a frequency in the general range of 3–10 kc.

3. A method as defined in claim 1 wherein all of said surfaces are inductively heated simultaneously during said energizing step.

4. A method as defined in claim 3 wherein said alternating current has a frequency in the general range of 3–5 kc.

* * * * *